UNITED STATES PATENT OFFICE.

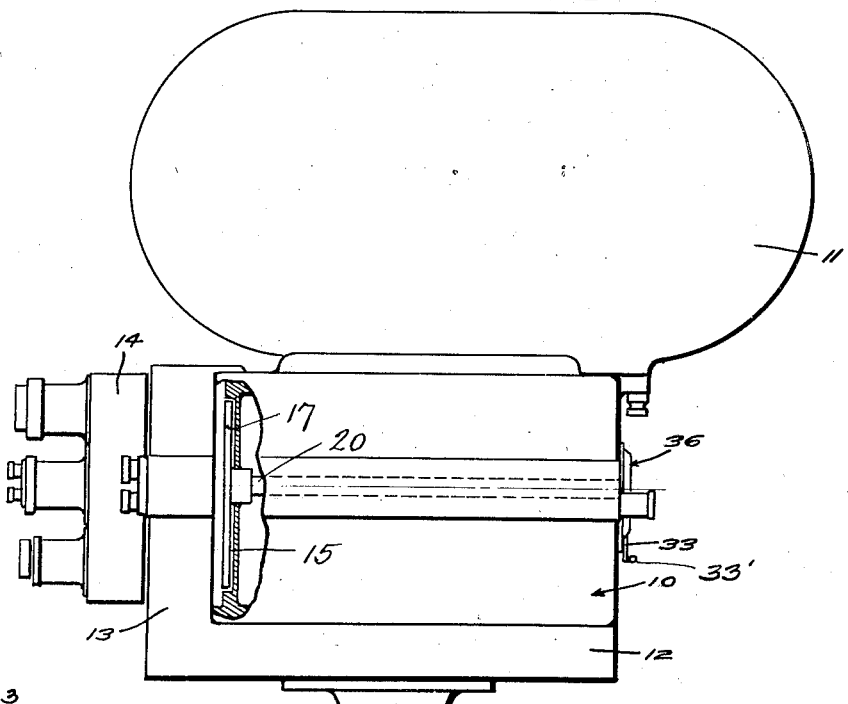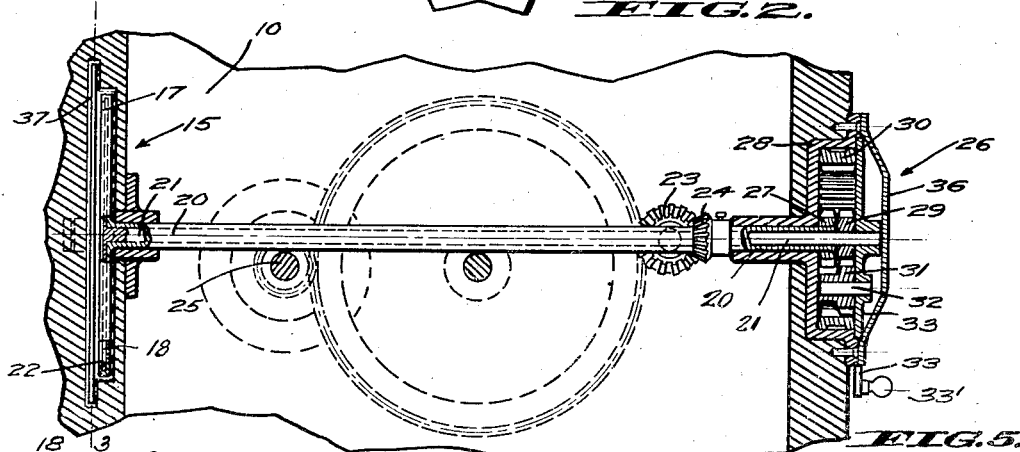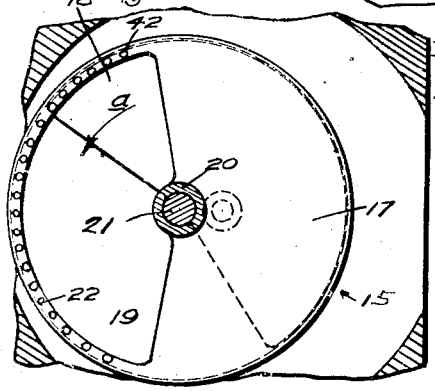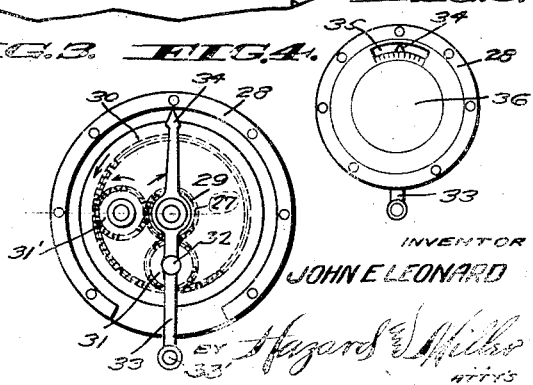

JOHN E. LEONARD, OF LOS ANGELES, CALIFORNIA.

SHUTTER-DISSOLVE FOR MOTION-PICTURE CAMERAS.

1,297,703.   Specification of Letters Patent.   Patented Mar. 18, 1919.

Application filed April 20, 1917, Serial No. 163,500. Renewed February 12, 1919. Serial No. 276,605.

*To all whom it may concern:*

Be it known that I, JOHN E. LEONARD, a citizen of the United States, residing at Los Angeles, in the county of Los Angeles and State of California, have invented new and useful Improvements in Shutter-Dissolves for Motion-Picture Cameras, of which the following is a specification.

This invention relates to a motion picture camera and particularly pertains to a shutter mechanism and a dissolve therefor.

It is the principal object of this invention to provide a shutter for instantaneously exposing a photographic film to light rays.

Another object of this invention is to provide means whereby the interval of exposure may be regulated during the continuous operation of the camera.

Another object of this invention is to provide means for permitting the interval of exposure of the film through the shutter opening to be gradually increased or decreased as desired, and thereby produce a dissolve effect upon the film.

Another object of this invention is to provide simple means for controlling the interval of exposure by the shutter without danger of interrupting the operation of the camera or placing undue strain upon any of its parts.

Another object of this invention is to provide means in combination with a shutter for easily changing the shape and size of the aperture through which the light rays are admitted to the photographic film.

It is a further object of this invention to provide a mechanism of the above character which is formed of few parts, easily assembled and operated, and which are not liable to become objectionably worn, or otherwise rendered inoperative.

Other objects will appear hereinafter.

The invention is illustrated, by way of example, in the accompanying drawings in which:

Figure 1 is a view in side elevation illustrating a motion picture camera with parts broken away to more clearly disclose the combined shutter and dissolve mechanism.

Fig. 2 is an enlarged fragmentary view in section and elevation disclosing the shutter, its driving mechanism and the dissolve control therefor.

Fig. 3 is an enlarged view of the shutter and particularly discloses the means for changing the size and shape of the exposed aperture, as seen on the section line 3—3 of Fig. 2.

Fig. 4 is a view in elevation disclosing the dissolve control with the front case removed to more clearly set forth its construction.

Fig. 5 is a view in elevation illustrating the dissolve control as it appears with its front case in place and further discloses the means for accurately determining the interval of exposure effected by the shutter.

Referring more particularly to the drawings, 10 indicates a camera case upon which is mounted a film magazine 11. The case is here shown as secured upon a supporting base block 12. This block is formed with a perpendicular lens support 13 to which a lens battery 14 is secured. Mounted within the camera case 10 is a shutter mechanism 15 which intermittently permits light to pass in through the photographic lenses and to fall upon a photographic film.

The shutter is composed of two elements. A continuous circular shutter member 17 and an auxiliary semi-circular screen 18. The shutter member 17 is formed with an exposure aperture 19. This aperture is formed with an outer arcuate edge and radial sides. As here shown, the aperture 19 is of a length slightly less than one-half the circumference of the shutter member 17. The shutter member 17 is mounted upon a driving sleeve 20 and the screen 18 is fixed to the end of a driving shaft 21 over which the sleeve 20 telescopes. In order to hold the shutter 17 and the screen 18 together face to face and to prevent light from leaking between them, the shutter 17 is formed with a continuous over-turned flange 22 which secures the circumferential edge of the screen 18 and yet permits it to move in relation thereto. The shutter and screen are driven in the direction of the arrow —*a*—, as indicated in Fig. 3 of the drawings, by means of a driving gear 23 in mesh with a gear 24 which is secured upon the sleeve 20. The gear 23 is indirectly driven by the crank-shaft 25 which is rotated by a suitable crank controlled by the operator, as will be understood.

The separate mountings of the shutter member 17 and the screen 18 are provided so that the screen may be adjusted to regulate the size of the exposure opening through the shutter. This is accomplished by means of the peculiar differential gear set 26 within which both the sleeve 20 and the shaft 21 terminate. The sleeve 20 is fitted with a small pinion 27 mounted within a differential gear case 28. The shaft 21 is fitted with a pinion 29 corresponding in diameter to that of the pinion 27 and disposed upon the same axis. The pinion 27 is connected to the internal gear 30 by an idler 31'. An idler pinion 31 is in mesh with the internal gear 30 and also in mesh with the gear 29 upon the shaft 21. This pinion 31 is mounted upon a shaft 32 which is secured within a radial lever arm 33. The lever arm 33 is formed with a bearing which permits it to be rotatably mounted upon the end of the shaft 21. A pointer 34 is formed upon the opposite end of the lever arm and may be observed through an opening 35 in the end of the cover plate 36. In this manner the exact position of the screen 18 may be determined in its relation to the shutter opening 19.

In operation, the entire shutter mechanism is driven by rotation of the shaft 25 which, as previously described, transmits power through a gear train to the gear 23 and thence to a gear 24. This gear is secured upon and adapted to rotate with the shutter sleeve 20. As the sleeve 20 rotates the shutter member 17 will be continuously rotated, as well as the gear 27, upon the opposite end of the sleeve. The rotation of this gear 27 will transmit motion through the idler 31' to the ring gear 30, which motion will thereafter be transmitted from the ring gear through the idler pinion 31 to the pinion 29 which is secured upon the end of the shaft 21. Due to the fact that the pinions 27, 29 and 31 bear a fixed ratio to each other and the ring gear, the pinions 27 and 29 will rotate in unison, under normal conditions. As the shaft and sleeve rotate in unison they will cause the shutter member 17 and the screen 18 to maintain a constant relation to each other and will, of course, fix the size of the aperture 19. In order that the shutter will rotate without acceleration due to the lightness of one of its sides through which the opening 19 has been made, a series of balancing lugs 42 have been distributed along the rim of the shutter and will place the member in equilibrium.

When it is desired to change the size of the aperture 19, the lever 33 is manipulated and swung upon its pivotal bearing on the end of the shaft 21. Movement of this lever will cause the small gear 31 to be swung around the shaft 21 and, due to the fact that it is in mesh with the internal gear 30 and the pinion 29 and the internal gear 30 is in mesh with the gear 31' meshing with the pinion 27, it will cause the shutter member 17 and the screen 18 to move relative to each other to increase or decrease the size of the exposure aperture 19 and this operation may be performed while the shutter is running at full speed. The train of gears 27, 31', 30, 31 and 29 serve to connect the sleeve 20 carrying the shutter member 17 to the shaft 21 carrying the screen 18 for simultaneous operation, and manipulation of the handle 33' serves to increase or decrease the size of the shutter aperture 19 without in any way interfering with the operation of the shutter. By this arrangement the shutter aperture may be varied in size without opening the camera case and the shutter and screen may be moved in relation to each other to produce a dissolve or to gradually bring in a picture, when desired.

It will thus be seen that the device here disclosed is simple in its operation, will not interfere with the continuous actuation of the camera and is composed of few parts of simple construction.

While I have shown the preferred construction of my shutter dissolve for motion picture cameras as now known to me, it will be understood that various changes in the combination, construction and arrangement of parts may be made by those skilled in the art without departing from the spirit of my invention.

I claim:

1. In a shutter construction for cameras, a sleeve, a shaft extending through the sleeve, a shutter member upon one end of the sleeve, a second shutter member upon the corresponding end of the shaft, a pinion upon the other end of the sleeve, a second pinion upon the shaft beside the first pinion, an internal gear, an idler connecting the first pinion to the internal gear, an idler connecting the second pinion to the internal gear, means for rotating the sleeve, and means for moving the idlers to and from each other.

2. In a shutter construction for cameras, a sleeve rotatably mounted, a shaft extending through the sleeve and rotatably mounted in the sleeve, a shutter member fixed upon one end of the sleeve and having an exposure aperture, a second shutter member fixed upon the corresponding end of the shaft and adapted to cover and uncover the exposure aperture, a pinion upon the opposite end of the sleeve from the shutter member, a second pinion upon the shaft beside the first pinion, an internal gear rotatably mounted and concentric to the pinions, an idler connecting the first pinion to the internal gear, an idler connecting the second pinion to the internal gear, a lever pivotally mounted upon the shaft; the shaft of one of the idlers being fixed in the lever; and a handle upon the lever; so that by manipulating the handle the idlers may be moved to and from each other to enlarge or reduce the exposure aperture.

3. In a shutter construction for cameras, a sleeve rotatably mounted, means for driving the sleeve, a shutter member fixed upon one end of the sleeve and having an exposure aperture, a shaft rotatably mounted in the sleeve, a second shutter member fixed upon the end of the shaft against the first shutter member and adapted to cover and uncover the exposure aperture, a pinion fixed upon the opposite end of the sleeve from the shutter member, a second pinion fixed upon the shaft beside the first pinion, an internal gear rotatably mounted concentric to the pinions, an idler connecting the first pinion to the internal gear, a lever pivotally mounted upon the shaft, an idler shaft fixed in the lever, a second idler upon the idler shaft and connecting the second pinion to the internal gear, a pointer extending from the lever, a handle extending from the lever, and an indicator adjacent the pointer; so that by manipulating the handle and observing the pointer the size of the exposure aperture may be adjusted.

In testimony whereof I have signed my name to this specification.

JOHN E. LEONARD.